US009799096B1

(12) United States Patent
De la Torre et al.

(10) Patent No.: US 9,799,096 B1
(45) Date of Patent: Oct. 24, 2017

(54) SYSTEM AND METHOD FOR PROCESSING VIDEO TO PROVIDE FACIAL DE-IDENTIFICATION

(71) Applicant: Carnegie Mellon University, Pittsburgh, PA (US)

(72) Inventors: Fernando De la Torre, Pittsburgh, PA (US); Jeffrey F. Cohn, Pittsburgh, PA (US); Dong Huang, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 36 days.

(21) Appl. No.: 14/794,165

(22) Filed: Jul. 8, 2015

Related U.S. Application Data

(60) Provisional application No. 61/998,793, filed on Jul. 8, 2014, provisional application No. 62/122,729, filed on Oct. 28, 2014.

(51) Int. Cl.
*G06T 3/00* (2006.01)
*A63F 13/25* (2014.01)

(52) U.S. Cl.
CPC .......... *G06T 3/0093* (2013.01); *A63F 13/25* (2014.09); *G06T 3/0056* (2013.01); *G06T 2207/20036* (2013.01); *G06T 2210/44* (2013.01)

(58) Field of Classification Search
None
See application file for complete search history.

(56) References Cited

U.S. PATENT DOCUMENTS

| 8,413,218 B1* | 4/2013 | Hopkins | H04N 7/141 715/753 |
| 2007/0192139 A1* | 8/2007 | Cookson | G06F 19/322 705/3 |
| 2009/0163262 A1* | 6/2009 | Kang | A63B 24/0062 463/8 |
| 2011/0123118 A1* | 5/2011 | Nayar | G06T 11/60 382/190 |

OTHER PUBLICATIONS

Huang et al., "Facial Action Transfer with Personalized Bilinear Regression", ECCV 2012, Part II, LNCS 7573, pp. 144-158, 2012.*
Zhang et al. "Rapid Modeling of 3D Faces for Animation Using an Efficient Adaption Algorithm", GRAPHITE '04 Proceedings of the 2nd international conference on Computer graphics and interactive techniques in Australasia and South East Asia, p. 173-181, Jun. 15-18, 2004.*
Meng et al. "Retaining Expressions on De-identified Faces", MIPRO 2014, 26-30 2014, Opatija, Croatia.*
Pollard et al. "Exploring e-Learning", ISBN 1-85184-305-1, 2001.*
Huang, et al., Facial Action Transfer With Personalized Bilinear Regression, Robotics Institute, Carnegie Mellon University, Oct. 2012.

* cited by examiner

*Primary Examiner* — Yingchun He

(57) ABSTRACT

A system and method for real-time image and video face de-identification that removes the identity of the subject while preserving the facial behavior is described The facial features of the source face are replaced with that of the target face while preserving the facial actions of the source face on the target face. The facial actions of the source face are transferred to the target face using personalized Facial Action Transfer (FAT), and the color and illumination is adapted. Finally, the source image or video containing the target facial features is outputted for display. Alternatively, the system can run in real-time.

13 Claims, 11 Drawing Sheets

SYSTEM AND METHOD FOR PROCESSING VIDEO TO PROVIDE FACIAL DE-IDENTIFICATION

RELATED APPLICATIONS

This application claims the benefit of U.S. Provisional Application Ser. No. 61/998,793, filed Jul. 8, 2014, and U.S. Provisional Application Ser. No. 61/122,729, filed Oct. 28, 2014.

GOVERNMENT INTEREST

This invention was made with partial government support under the National Science Foundation (NSF) grant number IIS1116583 and the Federal Highway Administration Award DTFH61-14-C-00001. The government has certain rights in this invention.

FIELD OF THE INVENTION

Described herein is a method to learn a personalized facial model that can produce photo-realistic person-specific facial actions (e.g., synthesize wrinkles for smiling), from only a neutral image of a target person, driven by a video or image of another person. This new method, referred to as "facial action transfer", or FAT, does not need an explicit correspondence of expressions across subjects. In addition, a system for exploiting FAT to de-identify faces in video stream and still images is described.

Facial Action Transfer from a source person to a target person (from which we only have one image) has applications in many different fields and is also applicable to preserve privacy of subjects in video (i.e., face de-identification), online image and video collections, and virtual avatars. A major challenge of FAT is to transfer subtle facial actions from the source (i.e., the live person or a recorded video) to the target (i.e., the single image of an alternate person) to create video-realistic outputs of the target person reproducing the expressions of the source person. The present invention refers to facial "action" transfer instead of facial "expression" transfer to emphasize that this new method is able to deal with subtle and spontaneous facial movement, rather than only imitating some predefined expressions (e.g., happy, sad, disgusted). Moreover, the method preserves person-specific features of the target person (e.g., moles, pimples).

BACKGROUND OF THE INVENTION

Existing approaches to expression transfer can be broadly grouped into two categories: direct transfer methods and learning-based transfer methods.

Direct transfer methods copy the shape and/or appearance changes of the source person to the target face image. Some prior art methods represent the face by a densely partitioned triangle mesh, usually containing up to $10^4$ triangles. The shape changes of a given expression are transferred to the target face as a set of local affine transformations while preserving the connectivity of the target triangles. However, these methods do not transfer appearance changes. Other prior arty approaches propose a geometric warping algorithm in conjunction with the Expression Ratio Image (ratio between the appearance of the neutral image and the image of a given expression) to copy subtle appearance details such as wrinkles and cast shadows to the target. However, this approach tends to produce artifacts on the target face image since the transferred appearance details are not adapted to the target face.

Learning-based expression transfer methods learn a transformation from a training set of face images that have been labeled across expressions. The correspondence is determined manually or semi-automatically. Existing learning-based expression transfer can be broadly classified into two major approaches: the regression-based and tensor-based methods.

Regression-based methods include two modalities: The first modality is regression between expressions that learns a mapping from a reference expression (e.g., neutral) to the expression to be transferred (e.g., a smile). Given a reference face of a target person, the smile face of the target person can be predicted with a regression specifically learned for the smile expression. However, a major limitation of this method is its inability to represent untrained expressions.

The second modality is regression between subjects that learns a mapping between multiple pairs of corresponding expressions performed by both the source and target subjects, and then uses the learned regression to transfer new expressions. In this case, there are no corresponding images between expressions of different people. One prior art method generates the corresponding images by learning a regression from a neutral face to the predefined expression and applying this mapping to the neutral of the target subject. In addition, the method learns a generic regressor from the shape to the appearance.

Another prior art method learns two Active Appearance Models (AAMs), one for the source and one for the target. It performs expression transfer by learning a mapping between AMMs' coefficients. This method also requires solving for the correspondence between the expressions of the target and source, which is not possible in many realistic applications.

Prior art tensor-based approaches perform Higher-Order Singular Value Decomposition (HOSVD) to factorize the facial appearance into identity, expression, pose, and illumination. Given the factorization, expression transfer is done by first computing the identity coefficients of the new testing person, and then reassembling the identity factor with expression factors learned by the HOSVD. A major drawback of tensor-based approaches is the need to carefully label correspondences across expression, pose, and illumination. Prior art methods have generalized the tensor-based approaches by building non-linear manifolds of human body actions and facial expressions. Similar to the standard tensor-based approaches, these methods require solving for the correspondence of states on the manifold (content) across different subjects (style).

The existing learning-based expression transfer methods rely on the availability and labeling accuracy of the similar expressions in faces of different subjects. However, labeling expressions is time consuming and error prone (i.e., it is hard to capture and solve correspondence for expressions under different intensities). In addition, in many applications it is not possible to have labeled training samples for the target.

The limitations and non-effectiveness of the prior art are overcome by the present invention as described below.

SUMMARY OF THE INVENTION

Recent advances in both camera technology as well as supporting computing hardware have made image and video acquisition close to effortless. As a consequence many applications capture image and video data of people for either immediate inspection or storage and subsequent sharing. These improved recording capabilities, however, ignite concerns about the privacy of people identifiable in the scene.

To address privacy concerns, automated methods to de-identify individuals in these images and videos are necessary. Existing methods for de-identification tends to destroy all information involving the individuals by distorting or blurring the face images of the subjects. These methods do not preserve the facial actions of the subjects that contain the valuable information for behavioral and medical studies. An advanced face de-identification algorithm should be able to obscure the identity of the subject without obscuring the action i.e. preserving the facial expression that may reveal, for example, a particular medical condition or any other situation relevant for any purpose.

The present invention describes a more practical approach to expression transfer which does not require expression correspondence across subjects. Moreover, it is able to generate photo-realistic renderings using a personalized bilinear regression that only requires one frontal image of the target. In addition, the present invention relates to methods for face de-identification in still images and videos. De-identification, in the context of the present invention, means removing the facial identity of a particular subject present in the image and substituting another facial identify, while preserving the facial actions of the subject.

The present invention describes a process referred to as Facial Action Transfer, or FAT. This process has diverse applications, for example, in the movie industry, in computer games, and for privacy protection. An object of FAT is to "clone" the facial actions from the videos of one person (source) to another facial image (target) and to "morph" the target facial image onto the source. In one aspect of the present invention, it is assumed that there is a video of the source person but only one frontal image of the target facial image.

The present invention includes a method to learn a personalized facial model that can produce photo-realistic person-specific facial actions (e.g., synthesize wrinkles for smiling), from only a neutral image of the target facial image. More importantly, the learning method of the present invention does not need an explicit correspondence of expressions across subjects.

A direct application of the technique is its use in face de-identification, a method to remove the identity of subjects in video and still images while preserving facial behavior (e.g, head pose, gaze, expression, etc.). The face de-identification mechanism of the present invention is a face masking approach based on the concept of Facial Action Transfer. The goal of FAT is to copy the facial actions of a source person and apply them to a target facial image.

The key differences of FAT from other image distortion methods are: (1) replacing person-specific identity information facial features of the source face to be protected with those of the target; and (2) preserving facial actions by generating video-realistic facial shape and appearance changes on the target facial image. These features of FAT make it an ideal choice over traditional face de-identification methods for masking the source identity.

Therefore, it is an object of the present invention to produce photo-realistic and video-realistic de-identified images and video that preserve spontaneous and subtle facial movements, while de-identifying the identity of the source person. It is another object of the present invention to intelligently de-identify the identity of a person.

Most successful methods for expression transfer require a training set with annotated correspondence between expressions of different subjects, sometimes including many images of the target subject. However, labeling expressions is time-consuming and error-prone and it is difficult to capture the same intensity of the expression across people. Moreover, in many applications it is not realistic to have many labeled images of the target. In the present invention the application can learn a personalized facial model that can produce photo-realistic person-specific facial actions (e.g., synthesize wrinkles for smiling) from only a neutral image of the target person. More importantly, in the present invention, the learning method does not need an explicit correspondence of expressions across subjects.

The present face de-identification approach is a more practical approach to expression transfer-based de-identification as it does not require heavy correspondence across expressions. Moreover, the application of the present invention is able to generate photo-realistic renderings using a personalized bilinear regression that only requires one frontal image of the target. Typically, the source images contain the person-specific facial features (e.g., glasses, freckles, wrinkles, eyelashes) that the target person might not have. Directly transferring facial appearance changes of the source to the target brings traces of source facial features and produces strong artifacts on the target image.

These and other features, objects and advantages of the present invention will be readily apparent to persons of ordinary skill in the art upon reading the entirety of this disclosure, which includes the accompanying drawings and claims.

BRIEF DESCRIPTION OF THE DRAWING'S

DETAILED DESCRIPTION OF THE INVENTION

Figure 1:
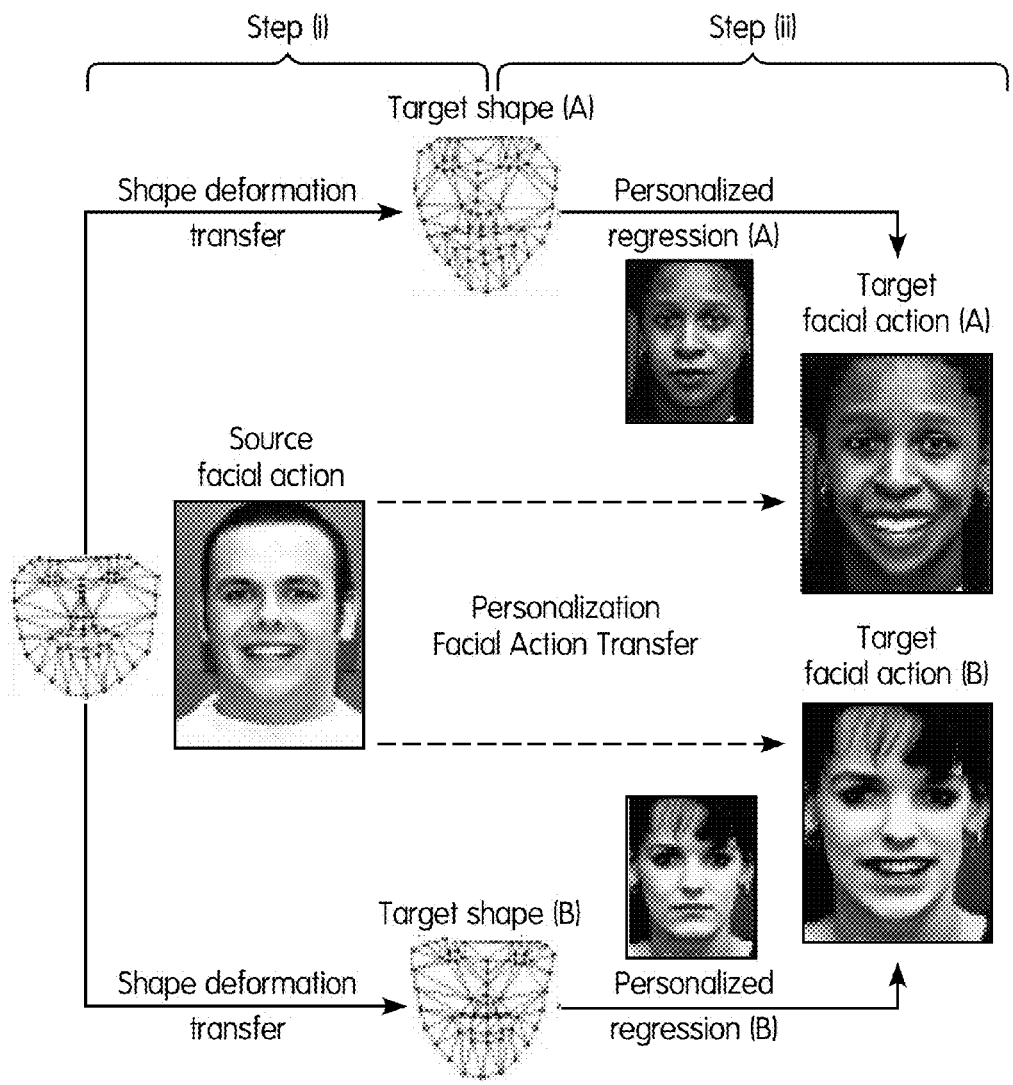
FIG. 1 shows an overview of the personalized FAT method.

In the present disclosure, numerous specific details are provided, such as examples of components and methods, to provide a thorough understanding of the various embodiments of the invention. Persons of ordinary skill in the art will recognize, however, that the invention can be practiced without one or more of the specific details. In other instances, well-known details are not shown.

The present invention includes a method to learn a personalized facial model that can produce photo-realistic person-specific facial actions (e.g., synthesize wrinkles for smiling), from only a neutral image of the target person. The present method does not need an explicit correspondence of expressions across subjects.

A major challenge of facial expression transfer is to transfer subtle facial actions from the source to the target to create video-realistic outputs. The present invention refers to FAT of facial "action" transfer, instead of facial expression transfer to emphasize that the method of the present invention is able to deal with subtle and spontaneous facial movement, rather than only imitating some predefined expressions (e.g., happy, sad, disgusted).

There are four major challenges to expression transfer: (1) Typically, the facial structure (shape) and texture (appearance) of the source subject and target face are quite different, as well as the dynamics of the facial actions. There are person-specific facial features in the source images (e.g., glasses, freckles, wrinkles, eyelashes) that the target might not have. Directly copying the shape and appearance changes from the source to the target can therefore result in artifacts in the rendered target person; (2) Although shape deformation transfer has been successfully applied to computer graphics, problems transferring the appearance/texture remains an unsolved problem due to the high dimensionality of the image data and potential nonlinearity of the facial actions; (3) An ideal algorithm should be able to factorize identity, expression and pose changes. However, this factorization is very difficult in practice, because the facial motions are combinations of the movement of facial muscles, head motion and person-specific features. Moreover, existing methods that decouple identity from expression (e.g., tensor and regression based methods) require correspondences across predefined expressions (e.g., happy, sad, disgust) for different subjects. Labeling the correspondence of facial expressions across subjects is time-consuming and error prone. Even if all subjects are instructed to pose with the same expression, they cannot perform the facial action with exactly the same style and intensity; and (4) In real world scenarios (e.g., interviews, movies), facial behaviors are spontaneous and usually combined with pose changes. The complexity of these facial actions are beyond the representation ability of predefined expressions (e.g., happy, sad, disgusted) that could be posed and labeled in controlled environments.

To solve these problems, the present invention describes a two-step approach for FAT, as shown in FIG. 1. In the first step, FAT transfers the shape of the source person to the target face (A) and (B) using a triangle-based deformation transfer method. In the second step, FAT generates the appearance of the target person using a personalized mapping from shape changes to appearance changes. The present invention considers that the physical structure of the face (e.g., bones, muscles and skin) defines a consistent and measurable pattern that relates the movements (shape changes) of facial components to the appearance changes for a particular person. Based on this intuition, FAT learns a bilinear regression between the shape and appearance changes from training images. A major contribution of this invention is to personalize the shape-to-appearance regression with only a single frontal image sample of the target. More importantly, unlike previous methods the present invention does not require the correspondence of expressions across training subjects. FIG. 1 illustrates this aspect of the present invention.

Personalized FAT

The present invention describes how to transfer the shape and appearance changes to achieve a personalized FAT method. FIG. 1 shows that the facial action of the source person (a smile) is transferred to both targets (A) and (B) in two steps: (i) Shape deformation transfer, where the shape change of the source with respect to his neutral face is transferred to the targets; and (ii) Generating the appearance changes using personalized bilinear regression. Observe how the wrinkles of the smile are adapted (i.e. personalized) to targets (A) and (B).

Transferring Shape Changes

Let $x_i^{neu} \in \Re^{v \times 1}$ a vector containing the two-dimensional coordinates of 66 landmarks (v=2×66=132) for the ith subject under the neutral expression (i=1, ..., p) (see FIG. 1). By performing Delaunay triangulation using these landmarks, the face region is partitioned into 106 triangles.

$$X_i^e = \{x_i^{e_1}, \ldots, x_i^{e_{n_i}}\} \in \Re^{v \times n_i}$$

is a matrix that contains the landmark coordinates of the $n_i$ face images for the $i^{th}$ subject performing different facial actions (i.e., superscript "e").

Note that, for purposes of this description, bold capital letters denote matrices X, bold lower-case letters a column vector x. xj represents the jth column of the matrix X. All non-bold letters represent scalar variables. diag is an operator that transforms a vector to a diagonal matrix or takes the diagonal of the matrix into a vector. vec(•) vectorizes a matrix into a vector. $I_k \in \Re^{k \times k}$ denotes the identity matrix. $1_n \in \Re^n$ is a vector of all 1s. vec(A) rearrange the elements of A in a vector. $\|x\|_2$ denotes the L2-norm of the vector x. $\|A\|_F^2$ designates the Frobenious norm of matrix A.

Figure 2:
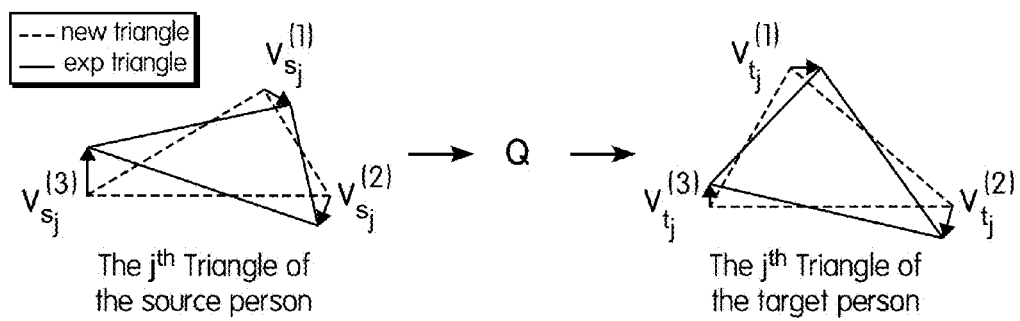
FIG. 2 illustrates a transfer shape change for a triangle of the face of the source subject to the corresponding triangle of the target face.

The first step to transfer shape changes is to compute the shape deformation from the neutral to the facial expression of the source subject. As shown in FIG. 2, an affine transformation between triangles is used. FIG. 2 illustrates a transfer shape change for $j^{th}$ the triangle of the source person (with vertex $\{V_{sj}^{(1)}, V_{sj}^{(2)}, V_{sj}^{(3)}\}$)) to the corresponding triangle of the target person (with vertex $\{V_{sj}^{(1)}, V_{sj}^{(2)}, V_{sj}^{(3)}\}$)). The dash and thick edged triangles represent the neutral expression and other expression, respectively. Q is the affine transformation matrix to be transferred.

In the second step, the triangle-wise shape transformation will be transferred to the target face.

The mapping between the neutral and a given facial expression of the source person (first step) is done as follows. Let the vectors $\{V_{sj}^{(1)}, V_{sj}^{(2)}, V_{sj}^{(3)}\} \in \Re^{2 \times 3}$ contain the two dimensional coordinates of the three vertices for the jth triangle of the source person (j=1, ..., 106). The matrix is the $V_{sj} = [v_{sj}^{(2)} - v_{sj}^{(1)}, v_{sj}^{(3)} - v_{sj}^{(1)}] \in \Re^{2 \times 2}$ is the translation-free representation of this triangle. The affine transformation $Q_j \in \Re^{2 \times 2}$ for the triangle from neutral is computed to an expression by minimizing:

$\min_{Q_j} \|V_{sj}^{exp} - Q_j V_{sj}^{neu}\|_F^2$, where $V_{sj}^{exp}$ and $V_{sj}^{neu}$ represent the $j^{th}$ triangle containing the landmarks of source facial expression to be transferred and the source neutral face, respectively.

After computing all triangle-wise shape changes between the neutral and a different expression of the source person, the next step is to transfer the shape changes to the target face. Let $\tilde{X}_i^e \in \Re^{2 \times 66}$ be a rearranged version of the target shape vector $x_i^e = \text{vec}(\tilde{X}_i^e) \in \Re^{132 \times 1}$.

Applying Qj's individually to the target neutral shape might result in disconnected vertexes. To solve this problem, the present invention transfers the transformations by minimizing:

$$\min_{x_t^c} \sum_{j=1}^{106} w_j \| V_{t_j}^{exp} - Q_j V_{t_j}^{neu} \|_F^2, \quad (1)$$

where $V_{ij}^{exp} = \tilde{X}_i^e S_j \in \Re^{2 \times 2}$, $S_j \in \Re^{66 \times 2}$ is a matrix of elements $\{-1, 0, 1\}$ that transforms $\tilde{X}_i^e$ to a translation-free representation $V_{ij}^{exp}$ for the $j^{th}$ triangle, and $w_j$ is the weighting coefficient proportional to the number of pixels within the $j^{th}$ triangle. Eq. (1) is a least-square problem and has a closed-form solution as:

$$x_t^c = \text{vec}\left[ \sum_{j=1}^{106} w_j Q_j V_{t_j}^{neu} S_j^T \left( \sum_{l=1}^{106} w_l S_l S_l^T \right)^{-1} \right]. \quad (2)$$

Estimating Appearance Changes from Shape Changes

Figure 3:
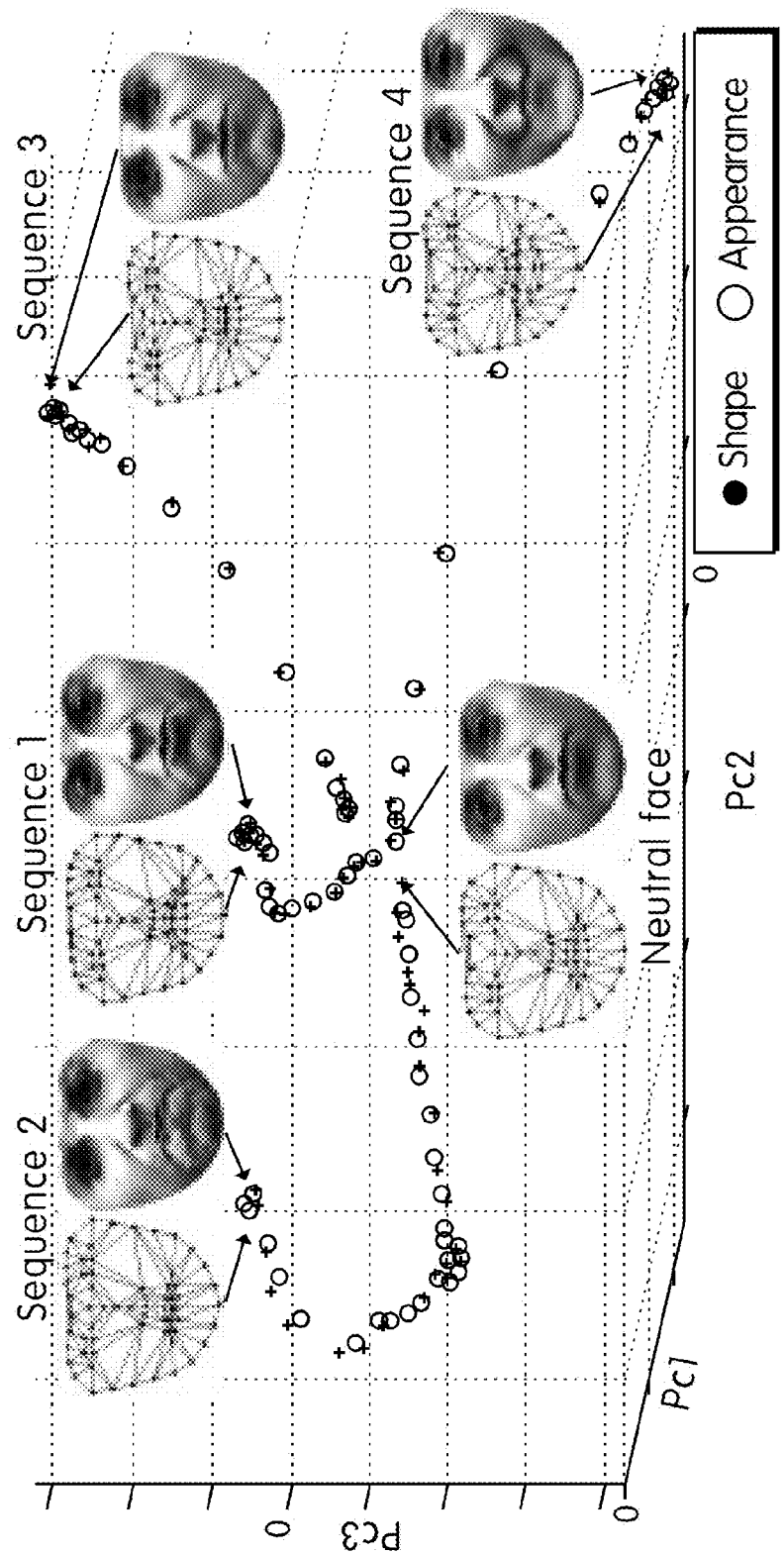
FIG. 3 illustrates a low dimensional embedding that shows the correlation between shape and appearance changes for four image sequences.

Once the shape changes have been transferred, the next step is to transfer appearance changes. The pixel intensity (appearance) of a face image is normalized by warping the pixels within each triangle to their corresponding pixels on a common template. $y_i^{neu} \in \Re^{d \times 1}$ is the normalized appearance vector (d pixels) for the $i^{th}$ subject.

$$Y_i^e = \{y_i^{e1}, \ldots, y_i^{e_{n_i}}\} \in \Re^{d \times n_i}$$

contains the appearance vectors for the $n_i$ face images. Directly transferring appearance changes is extremely difficult due to the high dimensionality of the image data and potentially nonlinearity of the facial actions. This process typically produces unwanted artifacts, as shown in the "Copy" column of FIG. 5. A key observation is that there is a strong correlation between the shape changes and the appearance changes performed by the same person. FIG. 3 shows the projection onto the first three principal components of the shape and appearance for four sequences of the same person. The shape and appearance are projected independently, and then an affine transformation is computed to align shape to appearance. As it can be observed (and also numerically validated), there is a strong correlation between shape and appearance that allows the present invention to predict the appearance from the shape. FIG. 3 illustrates a low dimensional embedding that shows the correlation between shape ("•") and appearance changes ("○") for four image sequences (82 face images in total) of subject "S014" in the Cohn-Kanade (CK) database. The circles ("○") are the projections of appearance changes of each face image with respect to the neutral face ($y^e - y_{neu}$) along the first three principal components (denoted by axis Pc1-Pc3). The dots ("•") represent shape changes ($x^e - x^{neu}$) projected in the three principal components after linear regression (alignment) to ($y^e - y^{neu}$).

After transferring the shape changes to the target, and assuming that samples of the target person have been trained, a person-specific model is built by explicitly learning a mapping T between shape (x) and appearance (y) that minimizes:

$$\min_T \sum_{e \in \Omega_i} \| (y_i^e - y_i^{neu}) - T(x_i^e - x_i^{neu}) \|_2^2, \quad (3)$$

where $\Omega_i$ is the index set of available instances of the $i^{th}$ subject performing different facial actions, $T \in \Re^{d \times v}$ is the regression matrix that maps the displacement of facial landmarks to the change of pixel intensity. Solving Eq. (3) leads to a person-specific regression matrix T. The column space of T correlates to the appearance changes and the row space of T correlates to the shape changes of the $i^{th}$ subject.

In realistic scenarios, there are no training samples of the target face. An alternative is to learn a generic regression using images from the training subjects but ignoring images from the target faces. However, as it is shown in the experimental part, the learned generic regression can only predict the averaged appearance changes for all training subjects, but it fails to model specific facial features from the target image. In addition, training instances would need to be well-sampled in order to generalize all facial actions to be transferred. In the following section, it is shown how the present invention personalizes the mapping T given only a neutral face image of the target.

Personalizing the Regression

For each person (i=1, . . . , p), the person-specific mapping $T_i \in \Re^{d \times v}$ minimizes $$E(T_i) = \| Y_{\Delta i} - T_i X_{\Delta i} \|_F^2 = \| Y_{\Delta i} - B_i A_i^T X_{\Delta i} \|_F^2, \quad (4)$$

where $Y_{\Delta i} = Y_i - y_i^{neu} 1_{n_i}^T \in \Re^{d \times n_i}$ and $X_{\Delta i} = X_i - x_i^{neu} 1_{n_i}^T \in \Re^{e \times n_i}$ contain the appearance and shape changes with respect to the neutral face, for all images belonging to the $i^{th}$ person. To avoid the curse of dimensionality and reduce the amount of parameters to estimate, the row and column subspaces of $T_i$ are explicitly modeled by the outer product of two matrices $T_i = B_i A_i^T$ [5], so that the column space of $B_i \in \Re^{d \times k}$ and $A_i \in \Re^{v \times k}$ are respectively correlated with the shape and appearance subspace of this person (k=rank($T_i$)). A necessary condition for the existence of a minimum of E (in Eq. (4)) with respect to $B_i$ and $A_i$ has to satisfy $$\frac{\partial E}{\partial B_i} = 0$$

and $$\frac{\partial E}{\partial A_i} = 0,$$

which leads to $$B_i = Y_{\Delta i} X_{\Delta i}^T A_i (A_i^T X_{\Delta i} X_{\Delta i}^T A_i)^{-1}, \quad (5)$$

$$A_i = (X_{\Delta i} X_{\Delta i}^T)^{-1} X_{\Delta i} Y_{\Delta i}^T B_i (B_i^T B_i)^{-1}, \quad (6)$$

Eq. (5) and (6) imply that the columns of $B_i$ and $A_i$ are in the subspaces spanned by the appearance changes $Y \Delta_i$ and the shape changes $X \Delta_i$, respectively. If Eq. (4) is solved over all facial actions performed by the $i^{th}$ subject, the column spaces of $B_i$ and $A_i$ are optimized to capture the specific shape and appearance changes for this subject, respectively. However, as mentioned before the person-specific model is not available in many applications, and the generic model is not accurate enough. The present invention personalizes $B_i$ and $A_i$ using only one neutral face.

A key aspect to build a personalized model from one sample is to realize that from a neutral image, the present invention predicts many different facial expressions. Observe that the neutral image has enough information to generate an approximation of the texture of a particular face under several expressions. That is $Y_{\Delta i} \approx [(R_1 y_i^{neu} \ldots R_n y_i^{neu}]$, where $R_i$ is a regressor for a particular expression (i=1, . . . , n). However, learning this expression-specific regressions requires carefully posed expressions and labeling expression across all subjects.

The present invention overcomes this limitation by explicitly learning the mapping from the appearance and shape of a neutral face to the person-specific matrices $B_i$ and $A_i$ for all training subjects (i=1, . . . , p). A mapping between a neutral face and a subspace of shape and appearance is learned. That is, the person-specific subspace is parameterized as: $B_i \approx [W_1 y_i^{neu} \ldots W_k y_i^{neu}]$, where $W_k \in \Re^{d \times d}$. In practice the number of parameters for each $W_k$ is large and some rank constraints have to be imposed to avoid overfitting. Alternatively, to solve this problem the present invention kernelizes the previous expression as: $vec(B_k) \approx B\phi_y(y_i^{neu})$, where $B \in \Re^{dk \times w_y}$ is a transformation matrix, and $\phi_y(\bullet) \in \Re^{w_y}$ is a kernel mapping of the neutral appearance from the d spaces to a $w_y$ (possible infinite) dimensional space. Observe that, the columns of matrix B span the dk dimensional space of person-specific matrices $B_i$'s that model possible appearance changes for all subjects (i=1, . . . , p). Similarly, $vec(A_i) \approx A\phi_x(x_i^{neu})$ where $A \in \Re^{vk \times w_z}$ spans the vk dimensional spaces of person-specific matrices $A_i$'s that model possible shape changes for all subjects (i=1, . . . , p), and $\phi_x(\bullet) \in \Re^{w_x}$ is kernel mapping of the neutral shape.

As in traditional kernel methods, this invention includes that the rows of the matrix B can be expanded as the combination of $\phi_y(Y^{neu})$, i.e., $B = R_{B\phi_y}(Y^{neu})^T$, where $R_B \in \Re^{dk \times v}$ is a coefficient matrix and $Y^{neu}$ contains all neutral appearances for i=1, . . . , p. Similarly, the row vectors of A can be spanned by $\phi_x(X^{neu})$, i.e., $A = R_{A\phi_x}(X^{neu})^T$, where $X^{neu}$ contains all neutral shapes. Using the kernel trick, Bi and Ai can be rewritten in the more compact forms as follow:

$$B_i \approx T_B(k_{y_i^{neu}}(x) I_k), A_i \approx T_A(k_{x_i^{neu}}(x) I_k), \quad (7)$$

where $T_B \in \Re^{d \times kp}$ contains re-organized elements of $R_B$, $T_A \in \Re^{v \times kp}$ which contains re-organized elements of $R_A$. $k_{y_i^{neu}} = \phi(Y^{neu})^T \phi(y_i^{neu}) \in \Re^p$ is the kernel vector measuring the similarity between the $i^{th}$ person with other subjects for the neutral appearance. Similarly, $k_{x_i^{neu}} = \phi(X^{neu})^T \phi(x_i^{neu}) \in \Re^p$ is the kernel vector measuring the similarity between the $i^{th}$ person with other subjects for neutral shapes.

Now the error in Eq. (4) can be rewritten by combining it with Eq. (7) as:

$$\min_{T_B, T_A} E(T_B, T_A) = \sum_{i=1}^{p} \|Y_{\Delta i} - T_B M_i T_A^T X_{\Delta i}\|_F^2, \quad (8)$$

where $M_i = (k_{y_i^{neu}}(x) I_k)(k_{x_i^{neu}}(x) I_k)^T \in \Re^{kp \times kp}$. To estimate $T_B$ and $T_A$, we use an alternated least square (ALS) method is used to monotonically reduce the error of E. ALS alternates between optimizing for $T_A$ while $T_B$ is fixed, and vice versa. This is guaranteed to converge to a critical point of E. The update equations for ALS are:

$$T_B = \left(\sum_{i=1}^{p} Y_{\Delta i} X_{\Delta i}^T T_A M_i^T\right)\left(\sum_{i=1}^{p} M_i T_A^T X_{\Delta i} X_{\Delta i}^T T_A M_i^T\right)^{-1}, \quad (9)$$

$$vec(T_A) = \left(\sum_{i=1}^{p} H_i \otimes G_i\right)^{-1} vec\left(\sum_{i=1}^{p} X_{\Delta i} Y_{\Delta i}^T T_B M_i\right), \quad (10)$$

where $H_i = M_i^T T_B^T T_B M_i$ and $G_i = X_{\Delta i} X_{\Delta i}^T$. Given an initial guess of $T_B$ and $T_A$, Eq. (9) and (10) are alternated until convergence.

For a new target person t, the neutral face by the shape $x_i^{neu}$ and appearance $y_i^{neu}$ is represented, and the personalized regression matrices as $B_i = T_B(k_{y_i^{neu}}(x) I_k)$ and $A_i = T_A(k_{x_i^{neu}}(x) I_k)$ is computed. Given the target shape change transferred from the source (Section 1.a above), the target appearance change $y_{\Delta i}^e$ is predicted using the personalized bilinear regression as $y_{\Delta i}^e = B_i A_i^T (x_i^e - x_i^{neu})$. Finally, the appearance vector of the target person under expression "e" is computed as $y_i^e = y_i^{neu} + y_{\Delta i}^e$.

Facial De-Identification

Advances in camera and computing equipment hardware in recent years have made it increasingly easy to capture and store extensive amounts of video data. This, among other things, creates many opportunities for the sharing of video sequences. In order to protect the privacy of subjects visible in the scene, automated methods to de-identify the images, particularly the face region, are necessary. So far the majority of privacy protection schemes currently used in practice rely on ad-hoc methods such as pixilation or blurring of the face.

Figure 8:
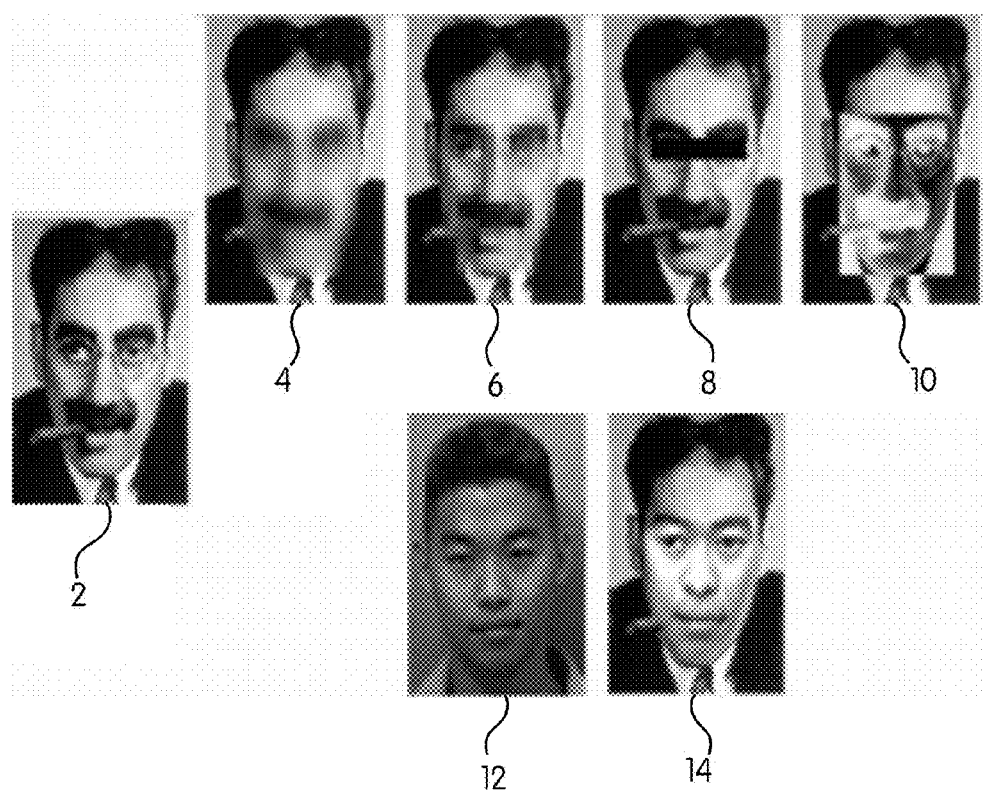
FIG. 8 shows examples of de-identification/masking methods.

In FIG. 8, the existing techniques for face de-identification are shown and compared to the present invention. An original face 2 is shown, which is then de-identified by using blurring 4, pixilation 6, bar mask 8 and negative 10. An example of the application of the present invention is shown where the original image 2 is treated as the source image and the image 12 is used as the target face. The result of the application of the technique described in the present invention is shown in image 14. The image 14 preserves the facial features of the original image 2 without obscuring his demeanor and eye movement.

There are three main components of the face de-identification approach of the present invention: (1) Person-independent facial feature tracking; (2) Face de-identification by personalized Facial Action Transfer (FAT); and (3) Adapting the illumination and color.

Figure 9:
FIG. 9 shows example results of person-independent facial feature tracking.

To make possible automatic methods for face de-identification in a video or a still image, it is necessary to detect and track facial features present in the video or the still image. In FIG. 9, real-time algorithms are used for facial feature tracking that produces state-of-the-art results. FIG. 9 shows tracking of facial features of a subject. The method for facial feature tracking is robust across different illuminations and pose changes. The method is described in co-pending U.S. patent application Ser. No. 14/596,148, entitled "System and Method for Detecting and Tracking Facial Features in Images".

Once facial actions are detected, there is a need to transfer the facial actions of the source face to the target face. Facial Action Transfer (FAT) generates face shape and appearance of the target face under the source facial actions. This is achieved by transferring local shape deformation, and personalized appearance estimation on the target face image.

Figure 10:
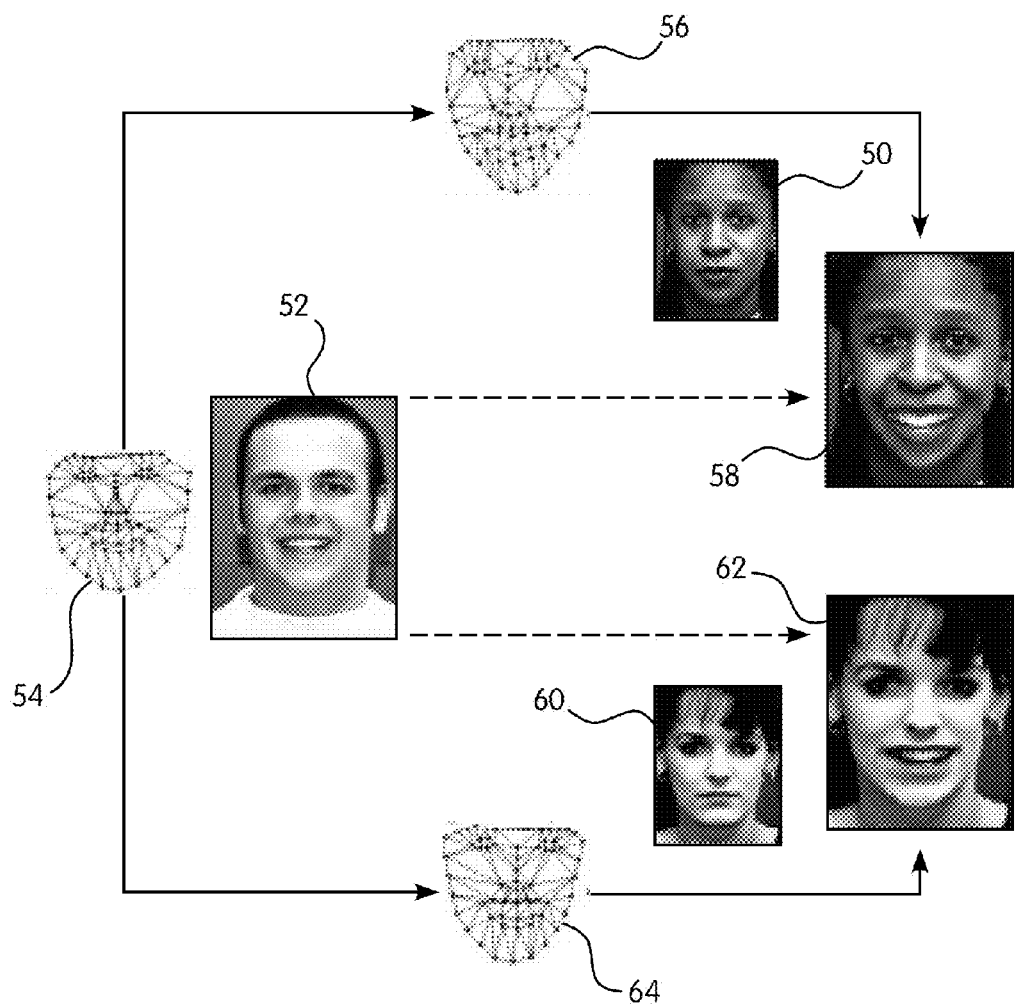
FIG. 10 shows an overview of personalized FAT method.

FIG. 10 shows a two-step approach of the present invention to generate video-realistic videos of de-identified faces. In the first step, the shape of the source face is transferred to the target subjects 50 and 60 using the triangle-based deformation transfer method. In the second step, appearance of the target subjects 50 and 60 using a personalized mapping is generated from shape changes to appearance changes. The physical structure of the face (e.g., muscles and skin) defines a consistent and measurable pattern that relates the movements (shape changes) of facial components to the appearance changes. The application learns a mapping between the shape and appearance from training images, and personalizes it with the neutral face of the source. The facial action 54 of the source person 52 is transferred to both target subjects 50 and 60 in two steps: (1) Shape deformation transfer, where the shape change of the source with respect to the neutral face is transferred to the target faces 64 and 56; and (2) Generate the appearance changes using personalized bilinear regression. The final result of this step being the adapted face 58 of target 50 and the adapted face 62 of the target 60.

Figure 11:
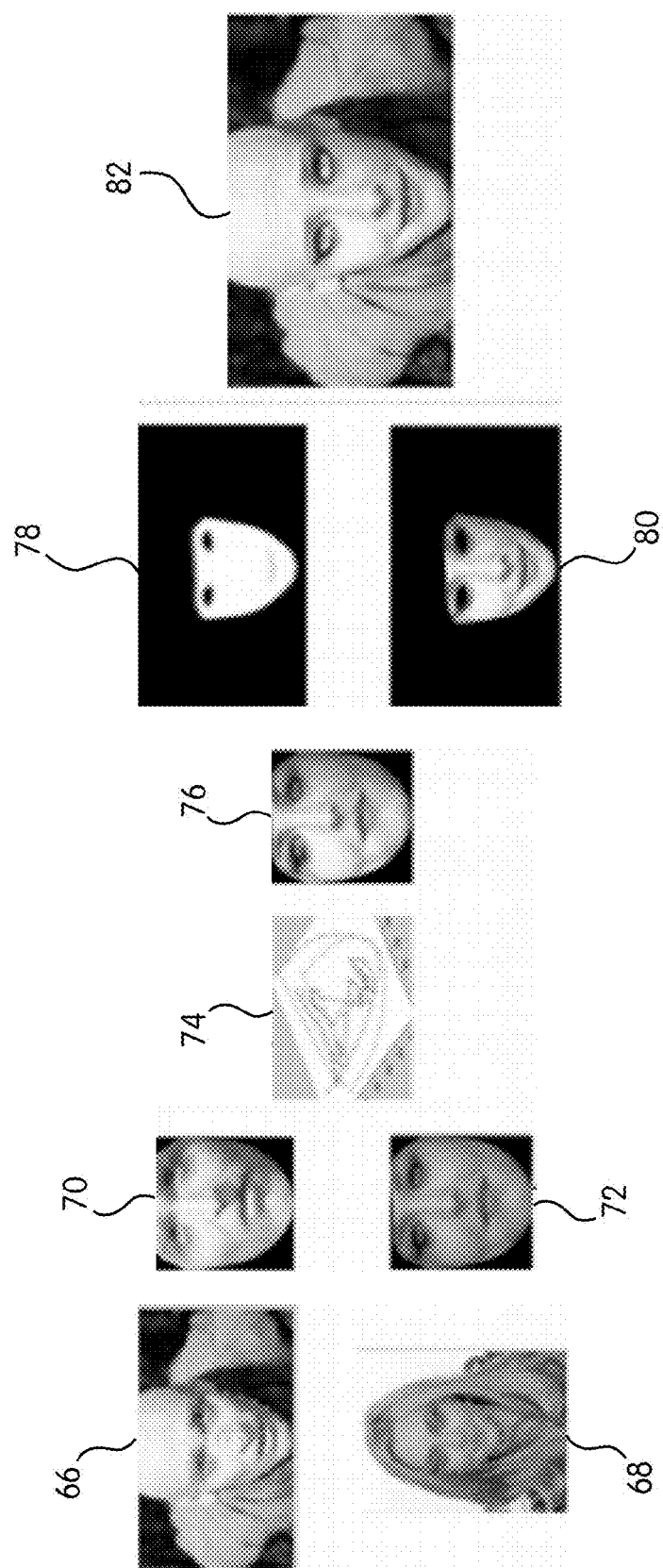
FIG. 11 shows illumination and color adaption method.

The lighting and color of the target face is adapted to that of the source subject to produce better and convincing results. In FIG. 11 on the source face 66 and target face 68 FAT is performed as it was done in earlier steps, and the FAT generated aligned target face 70 and the aligned source face 72 are aligned on a common template. Then the application adapts the illumination and color of the target face to the source image based on a 3D harmonics 74. Both the aligned faces 70 and 72 are represented as a generic cylindrical surface aligned to the coordinate system of the images. For each face, 3D landmarks 74 (the red dots on a 3D cylinder over the 2D landmarks) are adapted. Simple orthographic projection is used to define the mapping from the surface to the face image. The pixel intensity of the face region in each of the RGB color channels is approximated as using a linear combination of nine spherical harmonics. The application computes the nine harmonic coefficients for the source face, and uses these coefficients to reconstruct the pixel intensity of the target face 72.

Finally, the adapted target face 76 is warped and blended into the source face using a blending mask 78. Here, warping the target face to the source face is achieved using the triangle-wise warping approach. The warped target pixels in the source image are shown in 80. Then building a mask 78 over the warped face region and using the mask as the pixel-wise combination coefficients. The output image 82 is composed as a linear combination of the warped target face 80 and the remaining pixels in the source image. The output 82 is photo-realistic source face in which the original source facial features have been replaced by that of the target face.

There are numerous practical applications for the facial de-identification system and method described above and several such applications are described herein as specific embodiments of the invention. However, as one of skill in the art would realize, many different applications are possible.

In one embodiment, a method for personalized publicity is presented. In this embodiment, the user takes a frontal image of his/her face from a mobile platform, from a camera on top of the television or computer, or loads an existing image into the program. The television or computer will render in real-time an advertisement changing the face of the main actor to the face of the user (or a face that the user has selected). Adding the face of the user into the advertisement will boost the interest of the viewer to see the advertisement, and improve the effectiveness of marketing methods.

A major obstacle to sharing of recorded video for medical purposes has been the need to protect participants' identity. Similarly, concern about stigma is a reason that many people in need of mental health services (e.g., in the military) fail to do so. We propose to use our de-identification algorithm for de-identifying medical databases so they can be shared protecting the privacy of the patients, but preserving facial behavior. On the other hand, in situations where privacy between the patient and clinician wants to be preserved (e.g., due to social stigma in PTSD patients) our method could be used merged with the video-based conference applications (e.g., Skype) to de-anonymize the interaction.

For chronic diseases, for example, Parkinson's disease, long-term video monitoring is the most efficient and reliable way to record symptoms. By analyzing the videos, clinicians and researchers can not only reach a concrete and measurable understanding of the symptoms, but also acquire quantitative evidence for adjusting the treatment and therapy. However, distribution of video recordings to qualified clinicians and investigators for diagnosis, research and educational use is strictly controlled to protect the privacy and confidentiality of the patients. Even in research and educational applications, where video is widely used, the need to protect participant privacy necessarily places barriers to access, presenting a significant impediment to scientific discovery and clinical breakthroughs. De-identifying the participants in the videos would allow the videos to be shared as would any anonymous medical data that has been stripped of personal identifying patient information.

In addition to video database sharing, telemedicine is another area in which confidentiality concerns are a limiting factor. In telemedicine, therapists and patients or clients communicate over an audio-visual link. Telemedicine has proved effective in initial clinical trials for treatment of depression and could address the needs of populations with limited access. In rural locations, large distances between people in need of mental health services and qualified treatment providers make obtaining treatment and services difficult, if not impossible. On military installations, non-military personnel (e.g., spouses) often lack access to treatment, and many military personnel fail to seek needed treatment for depression, post-traumatic stress, and other disorders because of real or perceived concerns about stigma and negative career repercussions. However, for telemedicine to be adopted by these special populations, concerns about confidentiality of video transmission must be addressed. This is particularly the case when anonymity must be ensured for patients to feel sufficiently safe to initiate treatment.

To address these problems, facial de-identification as described herein, is necessary before videos can be distributed and analyzed. The most common and accepted methods of de-identification are distortion of the whole face image or portions thereof, such as blurring and pixilation. Face image redaction (aka suppression), an alternative method, eliminates all information within the target portion of the image. Even at moderate degrees of image distortion or redaction, the identity of the face may remain intact. To ensure anonymity of face images, large image distortion or redaction becomes necessary. Unfortunately, information about facial expression is then lost as well. Because facial expressions communicate emotion, pain, communicative intent and neurological and physiological status, removing facial expression greatly degrades the information contained within the videos, thereby reducing their usefulness.

It is now commonplace to have numerous surveillance cameras installed at public facilities, traffic centers, work places, as well as individual homes for security and monitoring purposes. In addition, police are beginning to record incidents from first person video cameras. The recorded videos are used for inspection, storage and sharing among a variety of parties. However, viewing the videos requires difference levels of security clearance. For instance, the personals in administration, law enforcement, medical care, media, and general public may all have access to videos but it may not be necessary or desirable to allow the identity of all people in the video top be available. Traditional solutions to this problem is to block the faces of interests by bar, blurring, and pixelization, which not only destroy the valuable facial actions but also the integrity of videos. In another embodiment of the invention, surveillance-type videos can have faces I the scene automatically anonymized, while still preserving their facial actions in video-realistic videos. In addition, the original videos can be rendered in real-time, and have different faces de-identified for the appropriate security clearance of the viewers. Only the people with the right access to the information (and password) will be able to have access to the real identity of the user. In an alternate embodiment, the method of the present invention uses watermarking techniques to add a non-visible word to the image, which may be used as a password to reveal the true identity of the de-identified subjects. A system for de-identifying faces in surveillance date would necessarily include a source of the surveillance data, such as one or more video cameras, and a processor running software which will provide the functions necessary to perform the de-identification.

In the entertainment field, teamwork and social activities are standard features in many online computer games. Players can use numerous accessories to personalize their avatars, but can choose only a handful of pre-designed virtual characters. Therefore, in another embodiment, the de-identification technique of the present invention allows the players to create personalized characters using only one frontal face image of the person of interest. Adding their face into the game and being able to transfer expressions will make the game much more engaging. For instance, multiple players can play against their colleagues. The facial expression transfer algorithms of the present invention will produce video-realistic facial appearance models from only one image of the target user. A system for incorporating user faces in a video game would necessarily include an add-on or built in capability in a video game which would run a program to perform the functions necessary to perform allow the de-identification of character appearing in the video game with the target faces of the user of the system.

In education and E-learning, many people take night and weekend courses to advance their education. Large distances between students in need of education and qualified providers make services difficult, if not impossible, to obtain. Live audio-visual links over the Internet have proved an effective solution for remote education services. In the internet based education program, students and teachers are able to communicate over live video stream. However, these services may cause unintentional and unwanted privacy risks for participants who potentially come from the same working community and are at competition. The need to protect privacy necessarily places barriers to access. Therefore, in yet another embodiment of the invention, facial de-identification can be used to anonymize the student's face in the video stream among the students while preserving the necessary face-to-face interaction in the courses. A system for de-identifying a student's face in a video stream would necessarily include a source of the video stream, such as a video camera, and a processor running software which will provide the functions necessary to perform the de-identification. In addition, such a system would also likely include one or more displays for displaying one or more de-identified video streams to multiple students and/or a teacher.

While specific embodiments of the present invention have been provided, it is to be understood that these embodiments are for illustration purposes and not limiting. Many additional embodiments will be apparent to persons of ordinary skill in the art reading this disclosure.

Supporting Data

This section provides quantitative and qualitative evaluation of this new method on two challenging databases: (1) Cohn-Kanade (CK) database: This database contains posed facial action sequences for 100 adults. There are small changes in pose and illumination in the sequences. Each person has several sequences performing different expressions for about 20 frames, beginning at neutral and ending in the peak of the expression. 442 sequences posed by 98 persons were used for which the 66 landmarks per frame were available. The total number of images used in the present experiments is 8036. (2) RU-FACS database: This database consists of videos of 34 young adults recorded during an interview of approximately 2 minutes, duration in which they lied or told the truth in response to an interviewer's questions. Head pose was mostly frontal with small to moderate out-of-plane head motion. Image data from five subjects could not be analyzed due to image artifacts. Thus, image data from 29 subjects was used.

Reconstruction Ability of the Shape-to-Appearance Mapping

In the first experiment, it was evaluated how well several shape-to-appearance mapping methods can reconstruct the facial appearance of subjects in the CK database. The performance of four approaches were compared: (1) "Generic" mapping, computed for all subjects; (2) Person specific mapping ("Per-Spec"), in which a different regressor $T_i$ was learned for each subject (Eq. (4)); (3) The personalized bilinear mapping ("Personal") estimated given only a neutral face of each person (Eq. (8)); and (4) "Direct warp", which is the baseline method where the pixels of neutral appearances $y^{neu}$ were directly warped to a common template.

The Relative Absolute Error (RAE) was computed between the estimated and the ground truth appearances on the common template as:

$$RAE = \frac{|y^{exp} - \tilde{y}^{exp}|}{|y^{exp} - \tilde{y}^{neu}|},$$

where $\tilde{y}_{exp}$ is the estimated appearance and $y_{exp}$ is the ground truth appearances. It was observed that the baseline method ("Direct warp") produces the same appearance as the neutral face on the common template (i.e. $\tilde{y}^{exp} = y_{exp}$) and its RAE is 1 for all images.

Figure 4:
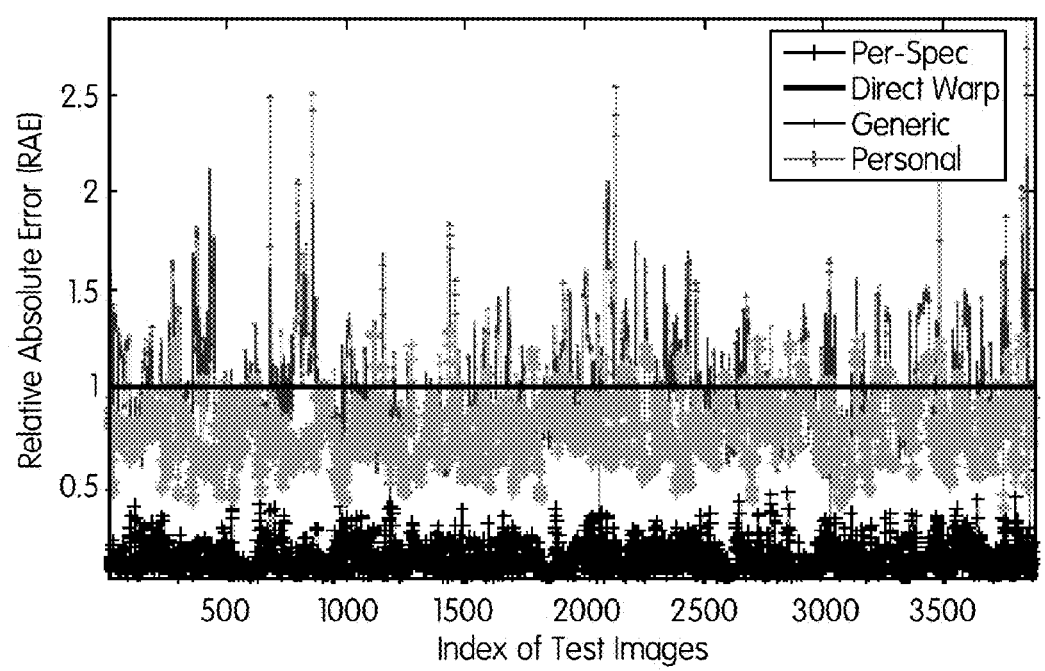
FIG. 4 shows a comparison of appearance reconstruction error over a random testing set from the CK database.

For each subject, the present invention considers the neutral face as the average of the first frame over all the sequences (between 2 and 6) for each subject. Half of the subjects (49) were randomly selected for training and cross-validation, and the other 49 subjects were used for testing. Gaussian kernels were used in Eq. (7) to respectively measure the similarity among neutral shapes and appearances. The bandwidth parameters for the neutral shape and appearance Gaussian kernel were chosen by cross-validation. The experiments were repeated 20 times. The average and standard deviation are summarized in Table 1. FIG. 4 shows an instance of the RAE on a randomly selected test set. Relative absolute error (RAE) is computed for 4 methods: "Per-Spec", "Direct warp", "Generic" and the new method "Personal". Note "Personal" uses only one neutral image per target subject.

TABLE 1

| | Per-Spec | Direct warp | Generic | Personal (Our method) |
|---|---|---|---|---|
| RAE | 0.1 ± 0.07% | 1 ± 0% | 0.93 ± 0.29% | 0.74 ± 0.15% |

As shown in FIG. 4 and in the table above, the "Generic" mapping produces the largest error because it computes the averaged appearance changes which, in many cases, are not the appearances the target (test) subject can produce. As expected from FIG. 3, the "Per-Spec" method achieves the least error because it learns the person-specific regression using the data of this particular subject. This further validates the strong correlation between shape and appearance. Note this is the ideal scenario, where there are images of the subject to train and test. Finally, the present invention ("Personal") produces lower RAE than the generic mapping using only a neutral face of each person.

Facial Action Transfer

This section presents qualitative (visual) evaluation of FAT on the CK database. Note that this is a different experiment from the one in the previous section. Now the goal is to transfer the expression to a different subject, and not to reconstruct the appearance from the shape of the same subject.

Figure 5:
FIG. 5 shows a facial action transfer from the source persons (the "Source" column) to the target persons (the neutral faces in the "Target" column) using various described methods.

49 subjects were used to learn the regressors, as explained in the previous section. The other 49 subjects were used as target subjects. The source images ("Source") for these 49 targets were randomly selected from the other 49 training subjects. The facial actions of the source images were transferred (FIG. 5 the "Source" column) to the target face. FIG. 5 shows the results for four methods: (1) Copying directly the shape and appearance changes from the source images to the target, the "Copy" column; (2) Person-specific mapping learned from available instances of each target person (for evaluation only, instances usually are not available in practice), the "Per-Spec" column; (3) The generic mapping computed for all training subjects, the "Generic" column; and (4) the new personalized regression, estimated from a neutral face of the target, the last column: "Personal". Here there is no comparison with "Direct warp" as in the previous subsection because it produces no appearance changes. The pixels within the mouth (e.g., teeth) in FIG. 5-7 are directly warped from the images of the source subject.

As shown in FIG. 5, the direct copying method ("Copy") does not adapt the expression changes of the source subjects to the specific facial features of the targets. It produced strong artifacts around the eye brows, cheeks and jaws of the target faces. The person specific method (the "Per-Spec" column) performed very well in reconstructing the appearance in the last experiment; however, it behaved poorly in the experiment of transferring the expression. In this case, the regression from shape to appearance using the video of the target person is learned, but there is no guarantee that the expression performed by the source will be represented in the available data of the target person. This is the reason why the person-specific method performs poorly. In fact, it is usually difficult to get well-sampled instances of the target subject. The generic mapping ("Generic") generates averaged appearance changes, which in many cases does not fit the specific facial features of the target subjects. The present invention ("Personal") estimates the personalized regression from only a neutral face of the target person, and it produces video-realistic personalized facial actions. Although the ground truth for the transferred expressions is not available, the result of the present invention is the one that is visually more video-realistic.

Face De-Identification

Figure 6:
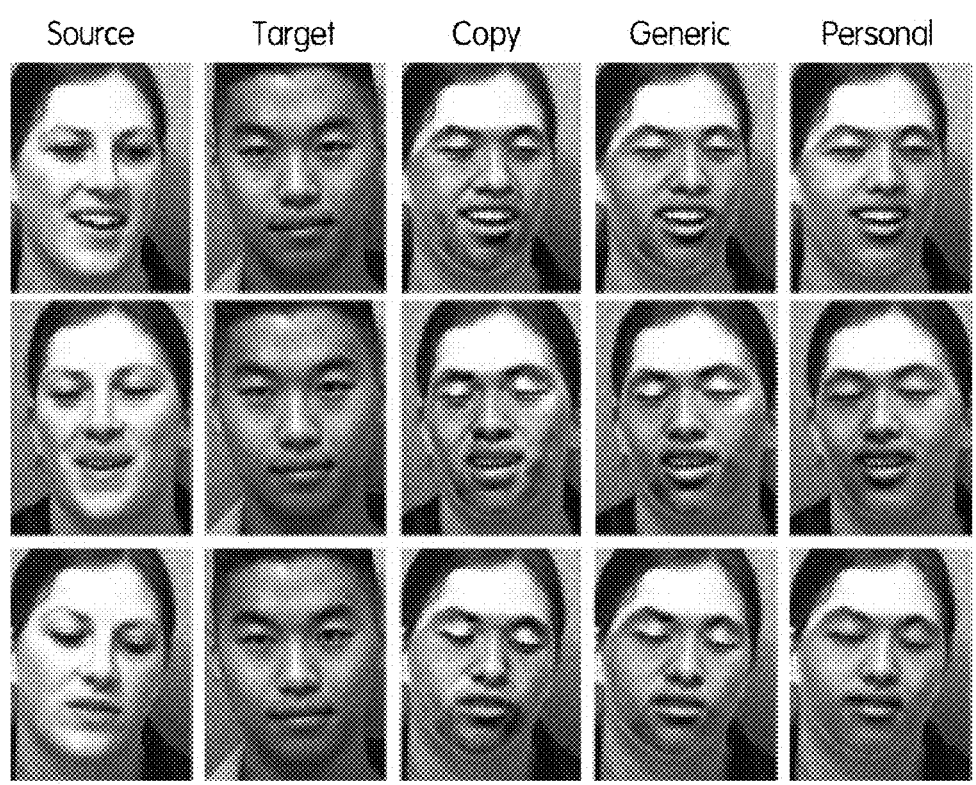
FIG. 6 shows the application of FAT to de-identification.
Figure 7:
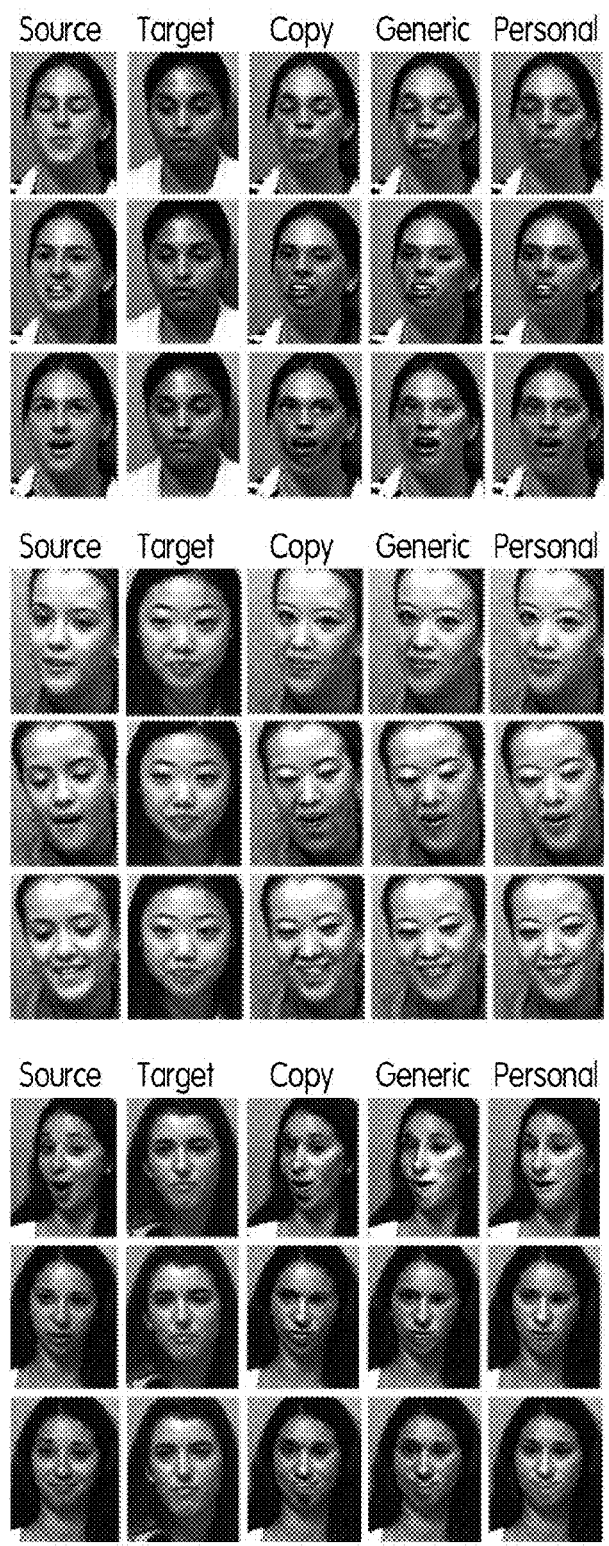
FIG. 7 illustrates the application of FAT to face de-identification (continued with FIG. 6). The "Copy" and "Generic" columns produce artifacts on the cheek, eyebrows and the jaw.

As shown in FIGS. 6-7, the facial actions of the source person were transferred (the "Source" column) to the target person (the "Target" column), and then the transferred target facial image patch was warped back to the image of the source person. This way, the identity of the source person was replaced with the target person performing the same facial actions. The three methods compared are: Direct copying ("Copy"), the generic mapping ("Generic") and the method of the present invention ("Personal"). For each pair of source and target persons in FIG. 6-7, three instances of de-identification including various head poses and subtle facial actions were shown. In all the instances, both "Copy" and "Generic" generate exceptional bright or dark texture in cheeks, eyelids, jaw and eyebrows. This is because the shape and appearance changes imposed in those regions are not suitable for the target facial features. Using the personalized regression estimated from one target neutral face, the present invention ("Personal") produces the realistic personalized facial actions compatible with the target facial features such as eyes, nose, lips and the skin. A person of different color skin is explicitly used as target to illustrate the de-identification process. FIGS. 6 and 7 show the application of FAT to de-identification: replacing the identity of the source persons (the "Source" column) with that of the target facial image (the "Target" column) performing the same facial actions. Three methods compared: Direct copying ("Copy"), the generic mapping ("Generic") and the method of the present invention ("Personal"). The "Copy" and "Generic" columns produce artifacts on the cheek, eyelids and around the mouth. To clearly illustrate the de-identified/replaced face region on the source images, the target skin is not adapted to the source skin.

The invention claimed is:

1. A method for face facial de-identification in an image or video comprising:
   obtaining an image of a source face represented as a plurality of source pixels;
   obtaining an image of a target face represented as a plurality of target pixels;
   computing the shape deformations of the source face with respect to a neutral face using triangle-based deformation and applying the same triangle-based deformation to the neutral face to deform the target face; and
   adapting illumination and color characteristics of the source face to the target face by:
   establishing a plurality of 2D landmarks on the source face and target face;
   for each of the source face and target face, estimating a plurality of 3D landmarks corresponding to the 2D landmarks and representing a surface over the 3D landmarks as a spherical surface;
   aligning source pixels to target pixels using triangle warping and calculating the corresponding pixels between the source pixels and target pixels;
   projecting the source pixels and target pixels onto their respective spherical surfaces and computing, for each source and target pixel, a harmonic basis;

calculating a plurality of harmonic coefficients representing an approximation of the intensity of source pixels in each of the RGB color channels; and constructing the pixel intensity for the target pixels as the product of the harmonic basis for the target pixels and the harmonic coefficients calculated with respect to the source pixels.

2. The method of claim 1 wherein the step of computing the shape deformations comprises:

computing a mapping between a plurality of triangles modelling said source face between a neutral expression and another facial expression; and applying said mapping to said target face to produce a substantially similar facial expression on said target face.

3. The method of claim 2 wherein said mapping is generated by learning a regression between said neutral expression and said other facial expressions.

4. The method of claim 1 further comprising:

encoding a password in a de-identified image; and permitting access to an identified image showing said source face when said password is input by a user.

5. The method of claim 1 comprising a prior step of performing facial feature tracking on said source face until a change in facial expression is detected.

6. A system for providing personalized publicity to a user comprising:

a display, for displaying one or more advertisements to said user;

a processor, running a program for providing the following functions:

obtaining an image of said user;

replacing the face of a person appearing in said advertisements with said image of said user; and transferring facial expressions of said person in said advertisements to said image of said user;

wherein the functions of replacing and transferring use the method of claim 1.

7. A system for de-identifying a face appearing in a video stream comprising:

a source of a stream of video;

a video processor running a program which provides the functions of:

detecting said face in said stream of video;

replacing said face with an image of an anonymous face; and transferring facial expressions of said face to said anonymous face;

wherein the functions of replacing and transferring use the method of claim 1.

8. A system for de-identifying faces in surveillance data comprising:

one or more cameras providing a stream of surveillance data; and a processor running a program which provides the functions of:

detecting a face in said stream of surveillance data;

replacing said face with an image of an anonymous face; and transferring facial expressions of said face to said anonymous face;

wherein the functions of replacing and transferring use the method of claim 1.

9. A system for enhancing a video game comprising:

a video game, rendered locally or online;

a processor running in conjunction with said video game, said processor running a program which provides the functions of:

obtaining an image of a user of said video game;

replacing the face of a person appearing in said video game with said image of said user; and transferring facial expressions of said person in said video game to said image of said user;

wherein the functions of replacing and transferring use the method of claim 1.

10. A system for providing communication to users for purposes of long distance learning comprising:

a camera, for obtaining a stream of video containing the face a user;

a video processor running a program which provides the functions of:

detecting the face of said user in said stream of video data;

replacing said face with an image of an anonymous face; and transferring the facial expressions of said face to said anonymous face; and a display, for displaying said stream of video data wherein the functions of replacing and transferring use the method of claim 1.

11. An apparatus comprising:

a processor; and memory containing logic for execution by the processor, the logic configured to:

obtain an image of a source face represented as a plurality of source pixels;

obtain an image of a target face represented as a plurality of target pixels;

compute the shape deformations of the source face with respect to a neutral face using triangle-based deformation and apply the same triangle-based deformation to the neutral face to deform the target face; and adapt illumination and color characteristics of the source face to the target face by:

establishing a plurality of 2D landmarks on the source face and target face;

for each of the source face and target face, estimating a plurality of 3D landmarks corresponding to the 2D landmarks and representing a surface over the 3D landmarks as a spherical surface;

aligning source pixels to target pixels using triangle warping and calculating the corresponding pixels between the source pixels and target pixels;

projecting the source pixels and target pixels onto their respective spherical surfaces and computing, for each source and target pixel, a harmonic basis;

calculating a plurality of harmonic coefficients representing an approximation of the intensity of source pixels in each of the RGB color channels; and constructing the pixel intensity for the target pixels as the product of the harmonic basis for the target pixels and the harmonic coefficients calculated with respect to the source pixels.

12. The apparatus of claim 11 wherein computing the shape deformations comprises:

computing a mapping between a plurality of triangles modelling said source face between a neutral expression and another facial expression; and applying said mapping to said target face to produce a substantially similar facial expression on said target face;

wherein said mapping is generated by learning a regression between said neutral expression and said other facial expressions.

13. The apparatus of claim 11 wherein the logic is further configured to:
    encode a password in a de-identified image; and
    permit access to an identified image showing said source face when said password is input by a user.

* * * * *